United States Patent [19]

Nolte

[11] Patent Number: 4,676,367

[45] Date of Patent: Jun. 30, 1987

[54] BELT CONVEYOR PLANT

[75] Inventor: Günther Nolte, Moers, Fed. Rep. of Germany

[73] Assignee: Conrad Scholtz AG, Hamburg, Fed. Rep. of Germany

[21] Appl. No.: 774,597

[22] PCT Filed: Dec. 18, 1984

[86] PCT No.: PCT/EP84/00408

§ 371 Date: Aug. 28, 1985

§ 102(e) Date: Aug. 28, 1985

[87] PCT Pub. No.: WO85/03057

PCT Pub. Date: Jul. 18, 1985

[30] Foreign Application Priority Data

Dec. 30, 1983 [DE] Fed. Rep. of Germany ....... 3347571

[51] Int. Cl.$^4$ ............................................. B65G 15/40
[52] U.S. Cl. ................................................... 198/821
[58] Field of Search ................. 198/821, 820, 818, 824, 198/690.2

[56] References Cited

U.S. PATENT DOCUMENTS

| | | | |
|---|---|---|---|
| 416,663 | 12/1889 | Blasdel | 198/821 |
| 507,156 | 10/1893 | Niedergesaess | 198/824 |
| 2,594,342 | 4/1952 | Pettyjohn | 198/821 |
| 2,751,065 | 6/1956 | Thomson | 198/818 |
| 2,925,903 | 2/1960 | Robbins | 198/818 |
| 3,773,167 | 11/1973 | McGinnis | 198/818 |
| 3,952,861 | 4/1976 | Holmqvist et al. | 198/842 |
| 4,061,223 | 12/1977 | McGinnis | 198/821 |

FOREIGN PATENT DOCUMENTS

| | | | |
|---|---|---|---|
| 1128826 | 5/1962 | Fed. Rep. of Germany . | |
| 1260062 | 3/1961 | France . | |
| 481815 | 1/1970 | Switzerland . | |
| 965840 | 8/1962 | United Kingdom | 198/820 |
| 947922 | 1/1964 | United Kingdom | 198/824 |
| 1104437 | 2/1968 | United Kingdom | 198/821 |

Primary Examiner—Joseph E. Valenza
Assistant Examiner—Cheryl L. Gastineau
Attorney, Agent, or Firm—Bell, Seltzer, Park & Gibson

[57] ABSTRACT

A belt conveyor plant for conveying bulk material outdoors and in particular on hilly terrain comprises supporting and locating systems 15,16 for the load section 5 and the return section 6 of its conveyor belt 4, which under omission of a supporting frame extending uninterruptedly between the two terminal stations 2, 3 of the belt conveyor plant are in each case carried by a bearer 14 anchored separately in the soil 7. The conveyor belt 4 sags freely between the bearers 14 arranged with greater mutual spacing of at least 5 meters as in the case of a cableway. Since it is impossible in such case to guide the conveyor belt 4 formed into trough shape, use is made of a so-called corrugated edge belt, i.e. a conveyor belt 4 having a transversely stable belt element 20, whereof the carrying side has installed on it two longitudinally continuous undulant edge strips 21 (FIG. 2).

7 Claims, 3 Drawing Figures

BELT CONVEYOR PLANT

FIELD OF THE INVENTION

The invention relates to a belt conveyor plant for conveying bulk material in open air and in particular hilly terrain between two terminal stations for the loading and offloading respectively of the bulk material.

BACKGROUND OF THE INVENTION

Conventional conveyor belt plants of this kind operate with a flat conveyor belt whereof the load section has a trough shape imposed on it to increase the conveying capacity. A continuous supporting framework extends between the two terminal stations, on which are situated carrier roller stations for guiding and supporting the load section and also the return section of the conveyor belt. The carrier roller stations for the load section impart the trough shape to the same. So that the trough shape is not lost between two consecutive carrier roller stations, their maximum mutual spacing is limited to comparatively small values, e.g. of 1 to 2 m and at most 4 m. The supporting framework and the carrier roller stations positioned at comparatively close intervals represent a considerable structural complexity. The application of a belt conveyor plant of the kind described is frequently impossible or possible only on a costly artificial grade in difficult and in particular hilly terrain, because of the need to have the supporting framework between the two end stations.

OBJECT AND SUMMARY OF THE INVENTION

The invention is based on the task of devising a belt conveyor plant for bulk or loose material for which a comparatively low degree of structural complexity is sufficient whilst being applicable equally well on optional terrain and in particular also hilly and difficult terrain without difficulty, whilst overcoming differences in altitude.

A belt conveyor plant which resolves this problem is characterised in accordance with the invention by the following features:

an endless conveyor belt of rubber or the like is provided, comprising a transversely stable belt member and two lateral undulant lateral sides, being so-called corrugated borders;

the two sections or legs of the conveyor belt run between the two end stations over a number of mutually spaced apart carrying and locating or guiding systems in each case, which are carried in each case by a bearer anchored separately in the soil or subsoil;

the conveyor belt sags freely between the carrying and locating systems;

the mutual spacing of the individual carrying and locating systems is dimensioned for a relative sag of at least 2% of the load section of the conveyor belt;

each carrying and locating system comprises devices for straight lateral guiding of the conveyor belt;

the carrying and locating systems allocated to the load leg are designed for belt guiding in flat non-concave form.

The belt conveyor plant according to the invention operates in accordance with the principle of a cableway. The conveyor belt is no longer supported and guided in practically continuous manner by means of a closely set succession of carrier roller stations but only on individual bearers positioned at operatively great mutual distances, which are anchored on or in the soil via an appropriate foundation in each case, separately that is to say without a mutual structural connection. A continuous support framework is eliminated thereby. The forming into trough shape of the conveyor belt or rather of its load section is also renounced. To secure adequate conveying capacity, the flatly guided conveyor belt is provided with two lateral corrugated sidewalls which endow the conveyor belt with a large box-shaped cross-section, in a manner known per se. This eliminates the beating effect placing the durability of a conveyor belt at risk upon utilising rollers imposing a trough shape, as engendered if the roller spacings are chosen too great. The conveyor belt sagging freely between the bearers may be deflected in transverse direction in these sections, e.g. under the action of winds. That it nevertheless retains its trajectory as a whole is accomplished by the devices for straight lateral guiding of both legs of the conveyor belt, which are provided on the bearers as part of the carrying and locating systems for the conveyor belt. Because of the elimination of the supporting framework, the belt conveyor plant according to the invention may also be utilised without difficulty—like a cableway—on difficult and in particular hilly terrain, meaning terrain such that it had not been possible until now to carry bulk material by means of a belt conveyor plant. Nevertheless, the structural complexity is comparatively small.

In the case of belt conveyors, the distance between two points of support for the conveyor belt, between which the conveyor belt sags, that is to say for example between two carrying rollers, is commonly calculated in accordance with the formula:

$$a = \frac{0.08 \cdot T}{G_G + G_B} \cdot p$$

In the same, a denotes the distance between the points of support in meters, T the belt traction force prevailing in the the conveyor belt section in question in kp, $G_G$ the weight of conveyed material per meter in kp/m, $G_B$ the conveyor belt weight per meter in kp/m, p the relative sag of the conveyor belt measured in vertical direction, in percent of the distance a (the relative sag is also referred as the sag ratio). The formula renders it apparent that the support spacing a is proportional to the relative sag p in a definite conveyor belt section, i.e. at predetermined belt traction force T and evidently predetermined belt weight and predetermined load. In conventional conveyor plants, the support or carrier roller spacing a is so selected that the relative sag amounts to 0.8%, but at most to 1%.

This principle applied until now was departed from deliberately moreover, in the case of the invention. The sag of the load leg of the conveyor belt is established at a minimum of 2%, and preferably at least at 2.5 or 3.5%, and quite preferentially at 4.5% at least, and the mutual spacing of the supporting and locating systems for the load leg or section or its supports is determined accordingly. This yields support spacings which greatly exceed the maximum quantities of 2–4 m usual until now and for example amount to around 40 m and more. Particularly great support spacings are the result in the case of sloping or steep conveying, because the belt traction force is great in its case, that is to say the support spacings become the greater the smaller the distance is from the upper end station, because of the belt traction forces rising in the rising direction.

The dimensional rule specified for the support spacing, i.e. the mutual spacing of the supporting and locating systems for the load leg is not intended to signify that a smaller spacing than resulting on the basis of the dimensional rule cannot be selected occasionnally in an individual case. This may be necessary for adaptation to the prevailing conditions of the terrain, e.g. to prevent the conveyor belt from touching the ground between two bearers or supporting and locating systems. It is also appropriate that the conveyor belt should be located with little sag along the first few meters following the loading end station and the last few meters preceding the discharge end station in a conventional manner, i.e. on comparatively closely set and uniformly spaced-apart carrying rollers, to assure unexceptionable loading and offloading.

On the score of an economic application of the bearers utilised, a supporting and locating system for the load section, as well as a supporting and locating system for the return section, will preferably be provided on each bearer. Departures therefrom may for example be appropriate if the return section sagging to a lesser degree because of the load absence does not require guiding at each bearer.

In a preferred form of embodiment, each supporting and locating system for the load section incorporates a convexly shaped carrying drum, preferably having lateral and radially projecting guiding flanges. The carrying drum to be constructed with a diameter of commensurately large dimension in case of need, allows of a mechanically reliable derivation of the high bearing forces occurring for the load section, to the bearer in question. The convexity of the carrying drum and the lateral guiding flanges represent uncomplicated devices for straight lateral guiding of the conveyor belt. In this connection, the rectilinear guiding capacity of the convexly shaped carrying drum becomes the greater, the greater the relative sag of the conveyor belt in front of and behind the carrying drum and thus the angle of enflankment on the carrying drum. A special significance may thus be attributed to the convexity of the carrying drum because of the relative sag being deliberately selected to be large in the case of the belt conveyor plant according to the invention. The rectilinear guiding action may however also be assisted by installing guiding rollers having an axis of rotation at right angles to the belt plane beside the conveyor belt, in front of and behind the carrying drum.

In the preferred form of embodiment, the supporting and locating systems for the return section or leg in each case comprise two co-axial disc wheels rolling along two marginal areas of the conveyor belt formed by lateral projection of the belt element beyond the corrugated edges and thus situated outside the conveying space, means for rectilinear guiding of the conveyor belt being formed by two lateral guiding flanges projecting radially over the disc wheels as in the case of the supporting and locating system for the load section or leg.

To reduce the lateral displacement of the conveyor belt under the action of wind, a section of rubber or the like, having a cross-section deflecting side winds and extending uninterruptedly in the longitudinal direction of the conveyor belt may in each case be installed externally beside the corrugated edges on marginal areas of the belt element projecting beyond the corrugated edges. This section is so shaped that it reduces the drag of the adjacent corrugated edge rising upwards from the belt element with respect to an externally impinging side wind.

Each section preferably has a Vee or V-shaped cross-section and has one of its branches resting flat on the belt element, its apex pointing towards the edge of the belt element. A section of this kind may not only be produced easily, but may also be affixed to the belt element easily, e.g. by bonding on, and then has a high degree of effectiveness. Furthermore, it is not strained excessively or even destroyed during the circulation of the conveyor belt around the end drums, because the second branch of the Vee of the section which points upwards obliquely in the normal case may then bear flat on the first and lower branch.

To allow of unexceptionable guiding and supporting of the return leg by means of two disc wheels, each section is appropriately positioned with spacing from the adjacent corrugated edge, so that a sectionfree portion of the marginal areas is left, with which the disc wheels may co-operate.

It is particularly advantageous if the sections are approximately half as high as the corrugated edges of the conveyor belt.

BRIEF DESCRIPTION OF THE DRAWINGS

The invention is described in particular in the following with other advantageous details, in respect of a diagrammatically illustrated example of embodiment. In the drawings.

DETAILED DESCRIPTION OF PREFERRED EMBODIMENT OF THE INVENTION

Figure 1:
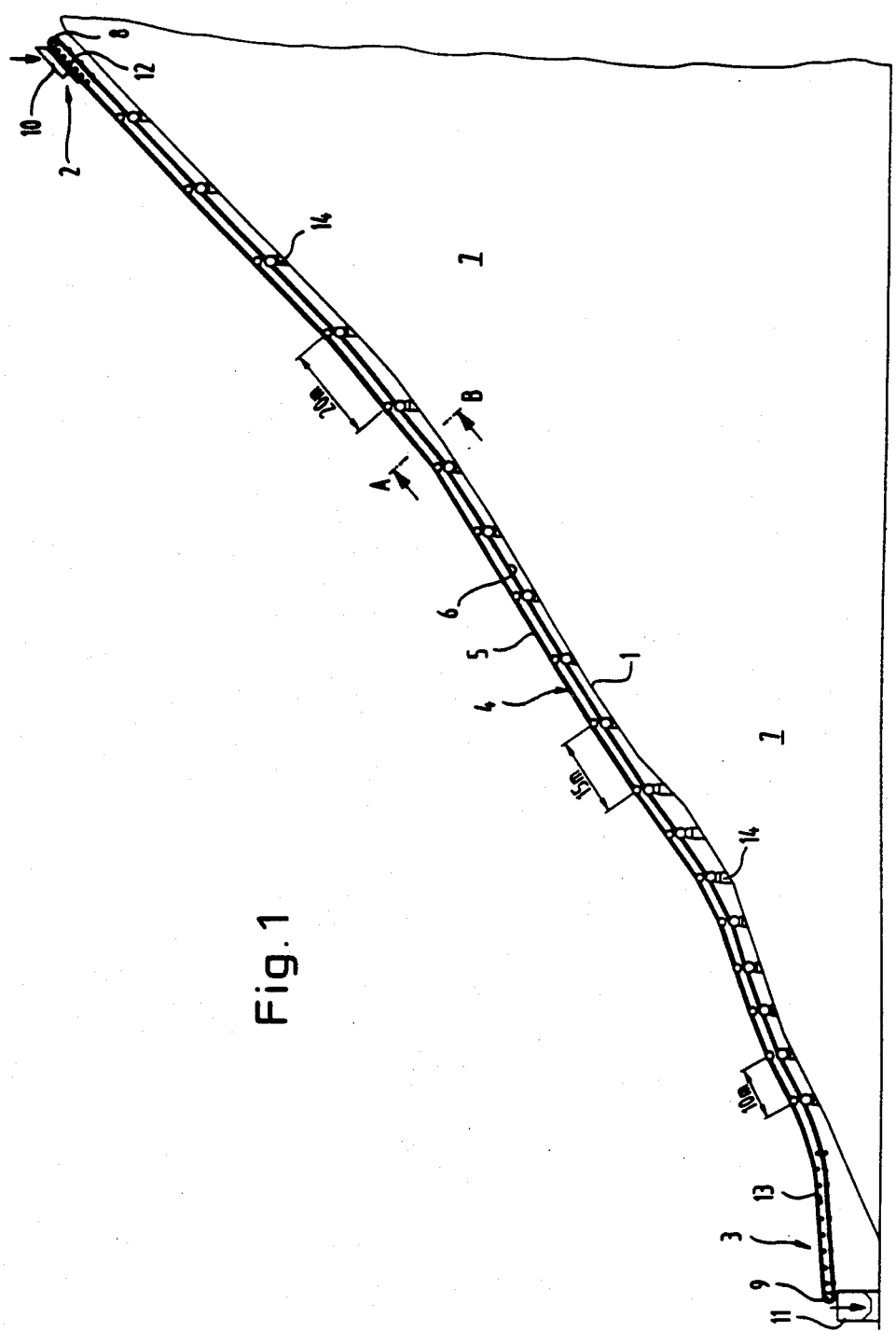
FIG. 1 shows a greatly simplified sideview of a belt conveyor system for downward conveying of bulk material on hilly terrain.

The belt conveyor plant illustrated as an example of embodiment is provided in hilly and comparatively steeply rising terrain, whereof the contour is shown by the line 1. The belt conveyor plant serves the purpose of downwardly conveying bulk material from an upper terminal loading station 2 to a lower delivery end station 3. The conveying device is a conveyor belt 4 of rubber circulating endlessly between the two end stations 2 and 3, the charged load section 5 of the conveyor belt being situated above the empty return leg 6 according to conventional arrangements. The two end stations 2 and 3 are also of conventional structure and each has an end drum 8 and 9, resp., a charging hopper 10 and a discharging hopper 11 as well as a series of carrying rollers 12 and 13, resp., for the two conveyor belt sections directly in front and behind their end drums. The two end stations each form a structural unit in a manner not shown in particular, which is firmly anchored in the subsoil 7 by appropriate constructional means.

A series of separate and mutually spaced apart bearers 14 is situated between the two end stations 2 and 3. The bearers 14 are arranged along a straight line between the end stations and are firmly anchored in the subsoil or soil, separately in each case, like the bearers of a cableway, by means of appropriate construction devices. The bearers 14 have different heights, in such manner that irregularities of the terrain are cancelled in some degree.

Figure 2:
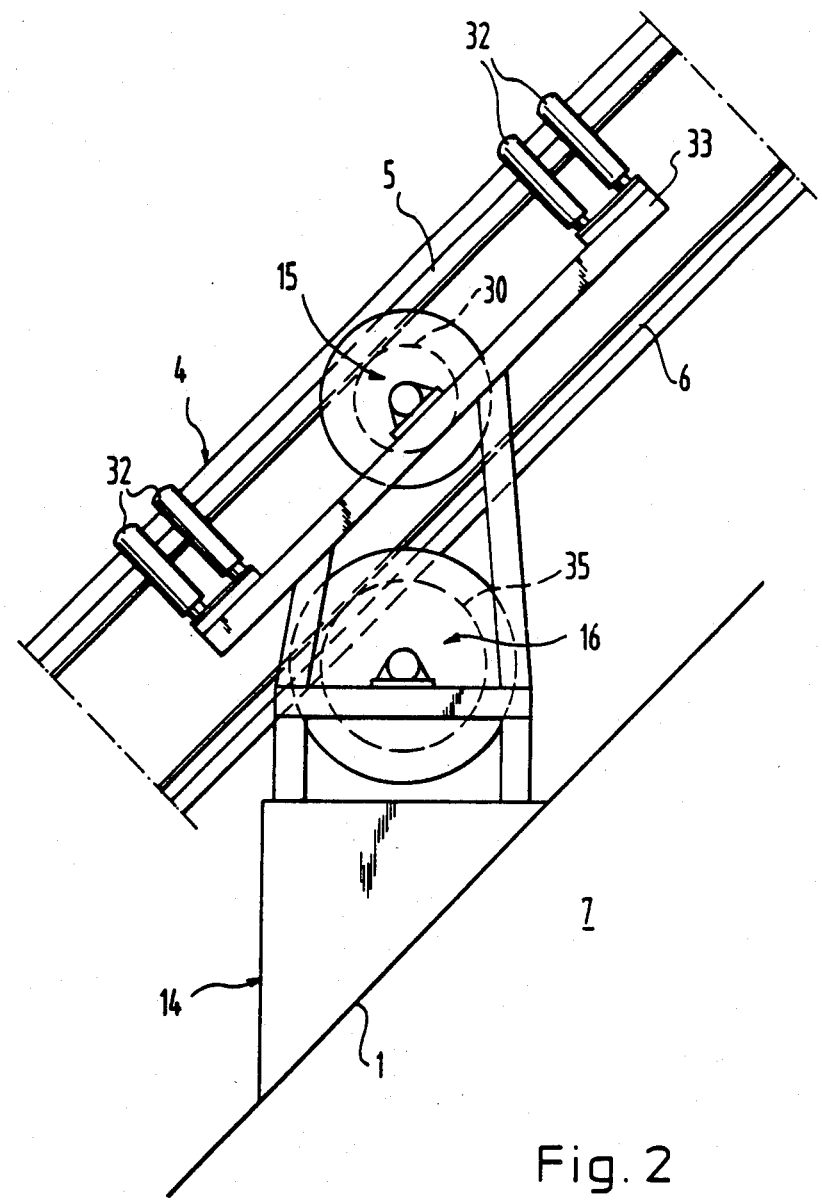
FIG. 2 shows a schematised sideview of a bearer of the belt conveyor system according to FIG. 1, comprising two supporting and locating systems for the load section and the return section of the conveyor belt of the belt conveyor system.
Figure 3:
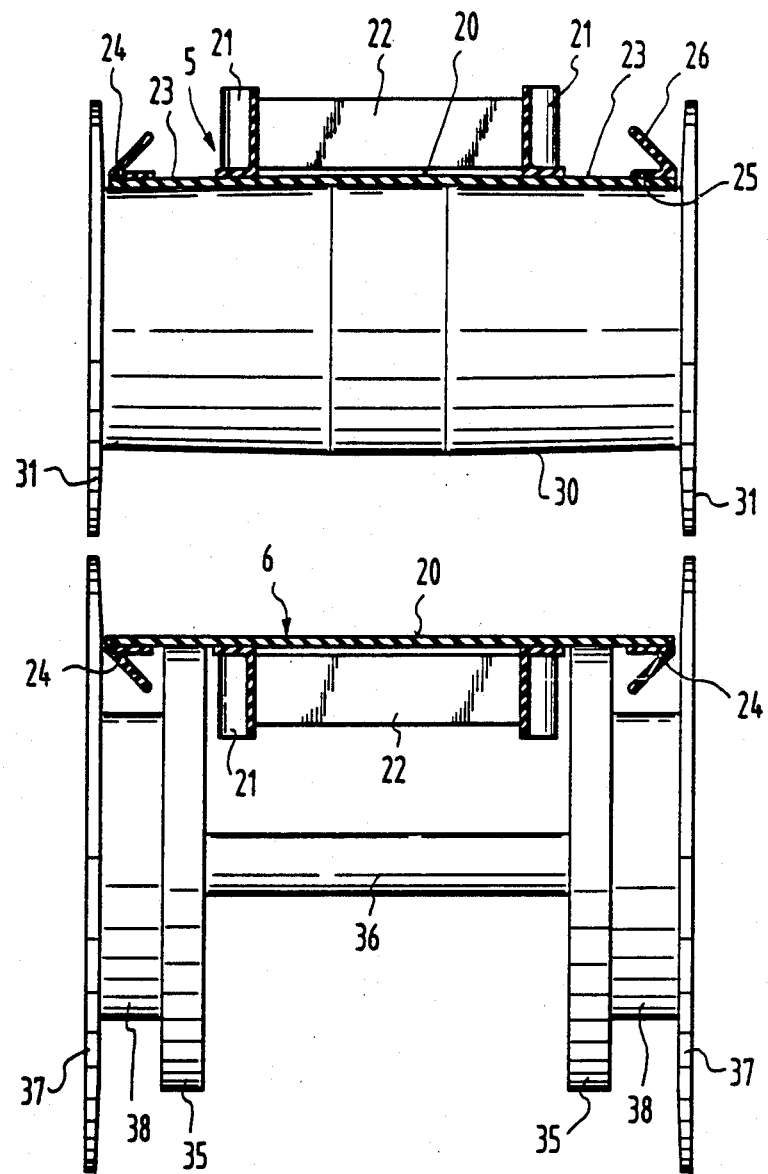
FIG. 3 shows an end view in the direction A-B in FIG. 1 of the carrying drum and of the disc wheels of the two supporting and locating systems according to FIG. 2.

Each bearer 14 carries a supporting and locating system 15 for the load section 5 of the conveyor belt 4 at the upper extremity and below that a supporting and locating system 16 for the return leg 6 of the conveyor belt. All the supporting and locating systems for the load leg and all the supporting and locating systems for the return leg are identically constructed in each case. Details are shown in FIGS. 2 and 3. The load section or leg 5 running over the supporting and locating systems 15 and the return leg 6 running over the supporting and locating systems 16, sags freely between the separate supporting and locating systems or rather their bearers 14. The mutual spacing of the bearers 14 is so selected that the relative sag of the load leg amounts to approximately 3.5% throughout, between adjacent bearers. The bearer spacings measured in the direction of extension of the conveyor belt 4, have values between 9 and 21 m in the example of embodiment. Three typical bearer spacings are entered in FIG. 1. All the bearers are so adequately tall that the return leg 6 runs without contact with the ground at all points.

The conveyor belt 4 guided flatly, without being shaped to trough form, comprises a transversely stable belt element 20, i.e. particularly rigid flexurally in transverse direction, whereof the load side has arranged on it two undulant marginal boards uninterrupted in the longitudinal direction, being so-called corrugated edges 21, which together with the belt element 20 delimit a box-shaped conveying cross-section, see FIG. 3. Entraining bars or cleats 22 which assure reliable entrainment of the bulk material even on the steeper portions of the conveying trajectory and extend in the transverse direction, are installed at regular longitudinal intervals on the belt element 20. The width of the belt element 20 is greater than the transverse spacing of the corrugated edges 21, so that the belt element has two lateral marginal areas 23 projecting beyond the corrugated edges 21 in transverse direction. Each marginal area 23 has installed on its carrying side a longitudinally continuous section 24 of rubber, which reduces the air drag opposed to a side wind incident on the conveyor belt by the adjacent corrugated edge 21. Each section 24 has a Vee-shaped cross-section comprising two branches 25 and 26 subtending an angle of say 45°. Each section 24 has one branch 25 glued flat on to the belt element 20, in such manner that its apex coincides with the longitudinal edge of the belt element. At the highest point, i.e. at the free extremity of the upwardly pointing branch 26, the sections have a height which is approximately half as great as the height of the corrugated edges 21. Each section 24 maintains distance from the adjacent corrugated edge 21, so that each marginal area 23 is not occupied by a section within a portion between the corrugated edge and the section.

For supporting the conveyor belt, each supporting and locating system 15 for the load section 5 incorporates a carrying drum 30 installed in freely rotatable manner on the bearer 4, whereof the diameter is distinctly greater than that of the conventional carrying rollers and whereof the width corresponds to the width of the belt element 20, and furthermore devices for the straight lateral guiding of the conveyor belt 4. These devices are formed by a slight symmetrical convexity of the carrying drum 30 as well as two guiding flanges 31 situated at the end sides of the drum and projecting radially above the same. In a manner known per se, the convexity of the carrying drum has the result that a force directed towards the centre of the drum is exerted on the conveyor belt 4 when the latter seeks to undergo a lateral deviation. The lateral deviation is complementarily limited by the guiding flanges 31. The action of these straight guiding devices is complemented and assisted by guiding rollers 32 arranged in pairs laterally with respect to the conveyor belt 4, with spacing from and in front of and behind the carrying drum 30. These are in each case mounted on the two extremities of two carriers 33 with the axis of rotation at right angles to the belt plane, said carriers for their part being so installed on the support 14 at either side of the carrying drum 30 that they extend approximately parallel to the load section 5.

Each supporting and locating system 16 for the return leg 6 incorporates two concentric disc wheels 35 which are installed on the bearer 14 in freely running manner on a common axis 36 and with mutual axial spacing. The width of the disc wheels 35 and their axial spacing are so selected that the return leg 6 may bear on the disc wheels 35 with the two section-free parts of the marginal areas 23 of the belt element, the corrugated edges 21 being situated in the space between the disc wheels. In view of its transverse stability, the belt element then undergoes practically no flexure despite being supported in the marginal areas 23 only. As a device for straight lateral guiding of the conveyor belt 4, the two disc wheels 5 in each case have present on their outer side a concentric and radially projecting guiding flange 37 which is connected to its disc wheel via a concentric intermediate wheel 38. The axial width of the intermediate wheels 38 is so dimensioned that the clear axial spacing of the guiding flanges 37 is the same as in the case of the guiding flanges 31 and a little greater than the width of the belt element 20. The diameter of the intermediate wheels 38 is so dimensioned that the sections 24 fit without fouling in the space between the disc wheel 35 and the guiding flange 37.

I claim:

1. Apparatus for conveying bulk material in open and hilly terrain including an endless belt conveyor assembly and two terminal stations carrying and driving said belt conveyor assembly and for loading and offloading the bulk material, said apparatus being characterized by not requiring a continuous supporting framework between said stations or a trough configuration to said belt conveyor assembly which were heretofore thought necessary and by providing a structure to negate the influence of wind blowing against the side of the conveyor belt assembly;

said belt conveyor assembly comprising an endless flat transversely-stable rigid belt of rubber or the like carried by said terminal stations at respective opposite ends thereof to define an upper load carrying leg portion and a lower return leg portion, longitudinally-extending corrugated edge portions mounted on the outside bulk material carrying surface of said belt inwardly of and along each outside edge of said belt and extending generally perpendicularly outwardly from the outside surface of said belt, entraining bars mounted in spaced relation at predetermined intervals on the outside bulk material carrying surface of said belt and extending outwardly from said outside surface of said belt and transversely of said belt between said corrugated edge portions to define with said belt and said corrugated edge portions generally box-shaped bulk material conveying compartments, and wind deflection members mounted along each side of the outside surface of said belt between said corrugated edge portions and the outside edges of said belt and extending outwardly from the outside surface of said belt and inwardly toward said corrugated edge portions to deflect and substantially negate the influence of wind blowing against either side of said endless conveyor belt assembly and against said corrugated edge portions; and said apparatus further including a series of separate, unconnected and mutually spaced bearers separately anchored in the soil of the surrounding terrain and positioned in generally a straight line between said two terminal stations and each including a separate supporting and guiding system for said load carrying leg portion and said return leg portion of said endless belt conveyor assembly for receiving and guiding said endles belt conveyor assembly during travel between said terminal stations without touching the underlying terrain and while allowing a predetermined sag of said endless belt conveyor assembly between said barriers, each of said supporting and guiding systems including means for straight lateral guiding of said endless belt conveyor assembly, and said supporting and guiding system for said load carrying leg portion of said endless belt conveyor assembly including means for supporting and guiding said load carrying leg portion in a nonconcave flat condition to maintain said rigid belt in its flat condition.

2. Apparatus, as set forth in claim 1, in which said wind deflection members comprise elongate members having a V-shaped transverse cross-section defining first and second legs, said first leg being secured to the outside surface of said belt between said corrugated edge portions and the outside edge of said belt, and said second leg extending outwardly from the outside surface of said belt and inwardly toward said corrugated edge portion.

3. Apparatus, as set forth in claim 2, in which said second leg of said wind deflection members extend outwardly from the outside surface of said belt approximately half the height of said corrugated edge portions.

4. Apparatus, as set forth in claim 1, in which each of said supporting and guiding systems of said barriers for said load carrying leg portion of said belt conveyor assembly includes a convexly shaped carrying drum having lateral and radially projecting guiding flanges.

5. Apparatus, as set forth in claim 4, in which each of said supporting and guiding systems of said barriers for said load carrying leg portion of said belt conveyor assembly includes guiding rollers having an axis of rotation at right angles to the plane of said belt and arranged laterally with respect to said belt and being spaced in front of and behind said carrying drum.

6. Apparatus, as set forth in claim 1, in which each of said supporting and guiding systems of said barriers for said return leg portion of said conveyor belt assembly includes two spaced co-axial disc wheels for supporting the portions of said belt between said corrugated edgs portions and said wind deflection members, and outer lateral and radially projecting guiding flanges.

7. Apparatus for conveying bulk in open and hilly terrain including an endless belt conveyor assembly and two terminal stations carrying and driving said belt conveyor assembly and for loading and offloading the bulk material, said apparatus being characterized by not requiring a continuous supporting framework between said stations or a trough configuration to said belt conveyor assembly which were heretofore thought necessary and by providing a structure to negate the influence of wind blowing against the sides of the conveyor belt assembly;

said belt conveyor assembly comprising an endless flat transversely-stable rigid belt of rubber or the like carried by said terminal stations at respective opposite ends thereof to define an upper load carrying leg portion and a lower return leg portion, longitudinally-extending corrugated edge portions mounted on the outside bulk material carrying surface of said belt inwardly of and along each outside edge of said belt and extending generally perpendicularly outwardly from the outside surface of said belt, entraining bars mounted in spaced relation at predetermined intervals on the outside bulk material carrying surface of said belt and extending outwardly from said outside surface of said belt and transversely of said belt between said corrugated edge portions to define with said belt and said corrugated edge portions generally box-shaped bulk material conveying compartments, and elongate wind deflection members having a V-shaped transverse cross-section defining first and second legs wherein said first leg is secured to the outside surface of said belt along each side of the outside surface of said belt between said corrugated edge portions and the outside edge portions of said belt and said second leg extends outwardly from the outside surface of said belt and inwardly toward said corrugated edge portions to approximately half the height of said corrugated edge portions to deflect and substantially negate the influence of wind blowing against either side of said endless conveyor belt assembly and against said corrugated edge portions; and said apparatus further including a series of separate, unconnected and mutually spaced barriers separately anchored in the soil of the surrounding terrain and positioned in generally a straight line between said terminal stations and each including a separate supporting and guiding system for said load carrying leg portion and said return leg portion of said endless belt conveyor assembly for receiving and guiding said endless belt conveyor assembly during travel between said terminal stations without touching the underlying terrain and while allowing a predetermined sag of said endless belt conveyor assembly between said barriers, said supporting and guiding system of said barriers for said load carrying leg portion of said belt conveyor assembly including a convexly shaped carrying drum having lateral and radially projecting guiding flanges and guiding rollers having an axis of rotation at right angles to the plane of said belt and arranged laterally with respect to said belt and being spaced in front of and behind said carrying drum for straight lateral guiding of said endless belt conveyor assembly and for supporting and guiding said load carrying leg portion in a non-concave flat condition to maintain said rigid belt in its flat condition, and said supporting and guiding system of said barriers for said return leg portion of said conveyor belt assembly including two spaced co-axial disc wheels for supporting the portions of said belt between said corrugated edge portions and said wind deflection members and outer lateral and radially projecting guiding flanges for providing straight lateral guiding of said endless belt conveyor assembly.

* * * * *